United States Patent [19]

Ikeda

[11] 3,863,268

[45] Jan. 28, 1975

[54] MAGNETIC HEAD

[75] Inventor: Yasuo Ikeda, Tokyo, Japan

[73] Assignee: Teac Corporation, Tokyo, Japan

[22] Filed: Mar. 1, 1974

[21] Appl. No.: 447,788

Related U.S. Application Data

[63] Continuation of Ser. No. 277,912, Aug. 3, 1972, abandoned.

[30] Foreign Application Priority Data

Aug. 7, 1971 Japan .............................. 46-70753
Aug. 7, 1971 Japan .............................. 46-70754

[52] U.S. Cl. .................. 360/121, 360/122, 360/125
[51] Int. Cl. ........ G11b 5/22, G11b 5/16, G11b 5/28
[58] Field of Search ........... 360/121, 122, 126, 125, 360/123

[56] References Cited

UNITED STATES PATENTS

| | | | |
|---|---|---|---|
| 2,908,770 | 10/1959 | Warren | 360/122 |
| 3,353,261 | 11/1967 | Bradford et al. | 360/125 |
| 3,453,398 | 7/1969 | Manders | 360/122 |
| 3,663,767 | 5/1972 | Shimotori et al. | 360/122 |
| 3,684,839 | 8/1972 | Homma | 360/128 |

FOREIGN PATENTS OR APPLICATIONS

| | | | |
|---|---|---|---|
| 912,461 | 12/1962 | Great Britain | 340/174.1 F |

*Primary Examiner*—Alfred H. Eddleman
*Attorney, Agent, or Firm*—Marshall & Yeasting

[57] ABSTRACT

A magnetic head having a magnetic core consisting of a U-shaped first core member formed with laminated magnetic alloy plates and second and third magnetic core members formed of ferrite, and a coil wound on the first magnetic core member, in which one end of each of the second and third magnetic core members of the magnetic core is joined to each end face of the first magnetic core member, the second and third magnetic core members extend inwardly to form a magnetic gap between the end faces thereof on the opposite side from the first magnetic core member and the exterior surfaces of the second and third magnetic core members on the side of the magnetic gap serve as a magnetic tape contact surface of the magnetic head. A magnetic head of the above construction in which the both end faces of the first magnetic core member and those of the second and third magnetic core members facing opposite to the former are selected so that the former (or the latter) may be included in the latter (or the former) in terms of shape and area. A multi-element magnetic head consisting of at least two magnetic head elements of the abovementioned construction and a magnetic shield plate interposed there between, in which the magnetic shield plate consists of a first magnetic plate member formed of a magnetic alloy plate and a second magnetic plate member formed of ferrite and the exterior surface of the second magnetic plate member serving as a tape contact surface.

1 Claim, 6 Drawing Figures

PATENTED JAN 28 1975 3,863,268

MAGNETIC HEAD

This is a continuation of application Ser. No. 277,912 filed Aug. 3, 1972 now abandoned.

BACKGROUND OF THE INVENTION

1. Field of the Invention

This invention relates to a magnetic head for use with magnetic tape recorders, and more particularly to improvements in a magnetic head such that the tape contact surface of a magnetic core is formed of a ferrite material.

2. Description of the Prior Art

The magnetic head comprises a magnetic core having formed therein a working gap and a coil wound on the magnetic core. The magnetic head now in use is of the type having the magnetic core formed of a ferrite material. This magnetic head is commonly referred to as a ferrite magnetic head. Since the tape contact surface of such a ferrite magnetic head is formed of the ferrite material which is highly excellent in wear resistance, the ferrite magnetic head well stands long use. However, the ferrite material is far higher in coercive force Hc than a magnetic alloy material such as permalloy, and hence is readily magnetized. Therefore, the ferrite magnetic head is defective in that a magnetic flux due to magnetization of the tape contact surface is readily recorded as a noise on a magnetic tape. Generally, the tape contact surface of the magnetic head is intermittently tapped with the flutter of the tape at high speed during operation, so that mechanical vibration is caused in the body of the core to induce noise in the coil. Since the core of the ferrite magnetic head is formed of the hard ferrite material, the tape contact surface is intermittently tapped by the flutter of the tape at high speed, by which great noise is likely to be induced.

A multi-element magnetic head is presently in use which is of the type that a plurality of ferrite magnetic heads are placed one on another. In this multi-element magnetic head, a shield plate is interposed between adjacent ferrite magnetic heads for avoiding crosstalk there between. The shield plate employed in the prior multi-element head is formed of a material different from that of the core, so that the tape contact surface of the shield plate is likely to project out from or sink in the tape contact surface of the ferrite magnetic head. Consequently, with the multi-element magnetic head after long use, the magnetic tape becomes curved or expanded when running across the head.

SUMMARY OF THE INVENTION

One object of this invention is to provide a magnetic head which is excellent in wear resistance and which neither records noise on the magnetic tape due to magnetization of the tape contact surface of the magnetic core nor induces noises in the coil even if the tape contact surface of the magentic core is tapped due to flutter of the magnetic tape.

In the magnetic head of this invention, the magnetic core consists of core members serving as the tape contact surface and a core member having a coil wound thereon, the former core member is formed of a magnetic alloy material which is relatively high in permeability, relatively low in coercive force, soft and excellent in workability. Therefore, the magnetic head of this invention is excellent in wear resistance. Further, in the magnetic head of this invention, even if the tape contact surface of the core members formed of the ferrite material is once magnetized, the magnetism is discharged to the core member formed of the magnetic alloy material to demagnetize the tape contact surface. Thus, with the magnetic head of this invention, noises due to magnetization are not recorded on the magnetic tape. Further, even if the tape contact surface formed of the ferrite material is tapped due to flutter of the magnetic tape to cause mechanical vibration in the body of the core members formed of the ferrite material, the mechanical vibration is absorbed and damped by the abutting portion of the core members of the ferrite material with that of the soft magnetic alloy material and the latter material itself. Accordingly, in the magnetic head of this invention, no noise is caused in the coil even where the tape contact surface formed of the ferrite material is tapped due to flutter of the tape. Further, in the magnetic head of this invention, the working gap is formed in the core members formed of the ferrite material, so that even if magnetic flux is centered at the neighborhood of the gap, loss of the magnetic flux is small. Consequently, a signal and a high-frequency bias currents supplied to the coil may be small.

Another object of this invention is to provide a magnetic head which is easy to assemble.

In the magnetic head of this invention, the areas of the end faces of the core members formed of a ferrite material, which face opposite to the end faces of the core member formed of a magnetic alloy material, are selected larger or smaller than that of the end faces of the latter. Accordingly, even if the core member having the small end face becomes slightly out of position relative to the core portion having the larger end face, the effective impedance of the core remains unchanged, so that the core of the magnetic head of this invention is easy to assemble.

Another object of this invention is to provide a multi-element magnetic head in which a plurality of magnetic head elements are assembled together with a shield plate being interposed between adjacent head elements, the core of each head element consisting of ferrite core members forming the tape contact surface and a core member formed of a magnetic alloy material and having wound thereon a coil.

In the multi-element magnetic head of this invention, the tape contact surface of the shield plate is formed of a ferrite material as is the case with the core members forming the tape contact surface of the magnetic head elements. Accordingly, even if the tape contact surface of the multi-element magnetic head becomes worn out after used for a long time, the tape contact surfaces of the magnetic head elements and that of the shield plate are flush with each other at all times. Therefore, with the multi-element magnetic head of this invention, the magnetic tape does not become curved or expanded when running across the tape contact surface of the head after long use.

Other objects, features and advantages of this invention will become apparent form the following description taken in conjunction with accompanying drawings.

DESCRIPTION OF THE PREFERRED EMBODIMENTS

Figure 1:
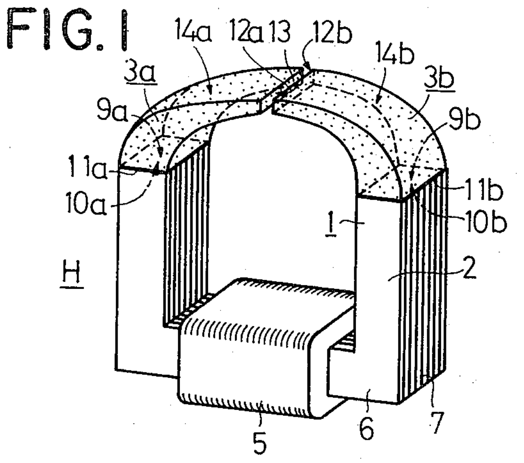
FIG. 1 is a perspective view schematically illustrating one example of a magnetic head produced according to this invention.

With reference to FIG. 1 one example of this invention will hereinafter be described.

In the figure, reference character H indicates generally one example of a magnetic head of this invention. The magnetic head H of this invention consists of a core 1 including a U-shaped magnetic core member 2 and a pair of curved magnetic core members 3*a* and 3*b* and a coil 5. wound on the magnetic core member 2.

The magnetic core member 2 of the core 1 is formed with magnetic alloy plates 6 laminated together by using an adhesive binder 7 and the magnetic core member 2 has flat end faces 9*a* and 9*b*. The magnetic alloy plates 6 are formed of a magnetic alloy material which is relatively high in permeability $\mu$ and in maximum magnetic flux density, low in coercive force H*c*, soft and hence excellent in workability. Such a magnetic alloy material may be 78 percent permalloy (Ni: 78 weight percent, Mo: 5 weight percent, Fe : 17 weight percent) having an effective permeability $\mu$ of 26,000 at 1KHz, a maximum magnetic flux density of 7,900 gausses a coercive force H*c* of 0.006 Oersteds and a Vicker's hardness number of 139, alperm (Al : 16 weight percent, Fe: 84 weight percent) having a maximum magnetic flux density of 8,000 gausses, a coercive force of 0.025 Oersteds and Vicker's hardness number 300, or sendust (Al : 6.2 weight percent, Si : 9.6 weight percent, Fe: 84.2 weight percent) having a maximum magnetic flux density of 8,000 gausses, a coercive force of 0.025 Oersteds and Vicker's hardness number 480, for example.

The magnetic core members 3*a* and 3*b* of the core 1 are formed of a ferrite material, which may be a Mn-Zn system ferrite having an effective permeability $\mu$ of 20,000 at 1KHz, form maximum magnetic flux density of 3,700 gausses, a coercive force H*c* of 0.015 oersteds, a wear resistance of less than 0.1 micron per 1,000 hours at a speed of 19 cm/sec. relative to a magnetic tape and a hardness number of 650. The magnetic core members 3*a* and 3*b* have flat end faces 10*a* and 10*b*. The flat end faces 10*a* and 10*b* of the core members 3*a* and 3*b* are joined with the flat end faces 9*a* and 9*b* of the core member 2 by the use of an adhesive binder as indicated by 11*a* and 11*b*. The core members 3*a* and 3*b* extend inwardly respectively and a magnetic working gap 13 is defined between end faces 12*a* and 12*b* of the core members 3*a* and 3*b* on the opposite side from the core member 2 and the front faces of the core members 3*a* and 3*b* form gently curved magnetic tape contact surfaces 14*a* and 14*b* respectively. In this case, the working gap 13 can be formed between the end faces 12*a* and 12*b* without interposing any spacer there between but the gap may also be formed by inserting a glass or other non-magnetic spacer between the end faces 12*a* and 12*b*.

The foregoing has outlined the construction of one example of the magnetic head produced according to this invention. With such a construction, since the tape contact surfaces 14*a* and 14*b* are formed with the exterior surfaces of the magnetic core members 3*a* and 3*b* made of ferrite, they are excellent in wear resistance as is the case with the ferrite magnetic head.

Further, since the magnetic core members 3*a* and 3*b* are joined with the magnetic core member 2 formed with magnetic alloy plates 6 being placed one on another, even if the magnetic core members 3*a* and 3*b* are formed of ferrite and are readily magnetized, magnetism produced in the tape contact surfaces 14*a* and 14*b* is let to escape to the magnetic core member 2 because the core member 2 is of high permeability, thus effectively eliminating the possibility that noises due to magnetization are recorded on the magnetic tape. Further, even if the tape contact surfaces 14*a* and 14*b* are intermittently tapped by the magnetic tape at high speed to produce vibration, the vibration is absorbed at the positions where the end faces of the core members 3*a* and 3*b* and those of the core member 2 are joined together by the adhesive binder 11*a* and 11*b* respectively, and the vibration is damped by the core member 2 because the core member 2 is soft. Accordingly, noise generation can be avoided substantially. Further, the entire magnetic core has not only the ferrite core members but also the core member 2 formed of the soft alloy plates and the soft alloy plates are far more excellent in workability than ferrite, so that workability of the entire magnetic core can be enhanced and, in addition, the yield rate of the core can be raised. The core member at the position where the coil is wound thereon is readily saturated as compared with the other portion of the core member but, in this invention, the coil is wound on the core member 2 formed of an alloy material of high maximum magnetic flux density, so that such saturation of the core member is not caused.

Further, a high-frequency bias current is supplied to the coil 5 when the magnetic head of this invention is actually used and, in this case, the magnetic flux due to magnetic fluxes caused by the high-frequency bias current is higher in the core members 3*a* and 3*b* in the neighborhood of the gap 13 as compared with that in the other portions. However, since the core members 3*a* and 3*b* are formed ferrite, magnetic flux loss due to the high-frequency bias current is relatively small and the high-frequency bias current may be small. Accordingly, the efficiency of the entire magnetic head can be enhanced.

Figure 2:
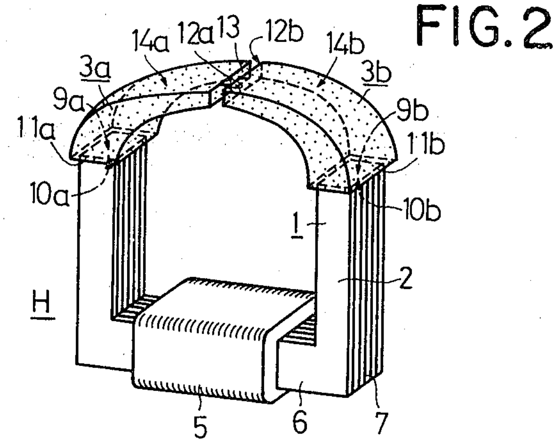
FIGS. 2 and 3 are perspective views, similar to FIG. 1, schematically showing other examples of this invention respectively.

Referring now to FIG. 2, another example of this invention will be described in detail. The magnetic head of this example is constructed on the basis of that described above in connection with FIG. 1. In the figure, parts corresponding to those in FIG. 1 are identified by the same reference numerals and no detailed description will be repeated. The magnetic head depicted in FIG. 2 is identical in construction with that of FIG. 1 except that the shape and area of the both end faces 9*a* and 9*b* of the core member 2 and those 11*a* and 11*b* of the core portions 3*a* and 3*b* facing opposite to the end faces 9*a* and 9*b* are selected in such a manner that the former may be contained in the latter. In practice, where the end faces 9*a*, 9*b*, 11*a* and 11*b* are rectangular respectively as shown in the figure, longitudinal and lateral lengths of the end faces 9*a* and 9*b* are selected smaller than those of the end faces 11*a* and 11*b* respectively. However, only the longitudinal (or lateral) lengths of the end faces 9*a* and 9*b* are selected substantially equal to those of the end faces 11*a* and 11*b*, though not shown, but the lateral lengths of the former may be selected different from those of the latter.

With the magnetic head of this invention illustrated in FIG. 2, even if the end faces 11*a* and 11*b* of the core members 3*a* and 3*b* are a little out of position relative to the both end faces 9*a* and 9*b* of the core member 2 in the assembling of the head, the relation that the end faces 9*a* and 9*b* are contained in those 11*a* and 11*b* remains unchanged because the end faces 11*a* and 11*b* are larger in area than those 9*a* and 9*b*. Therefore, the effective impedance of the magnetic head is not changed, so that it is possible easily to obtain a magnetic head having the effective impedance which is determined by the end faces 9*a* and 9*b* of the smaller area.

Figure 3:
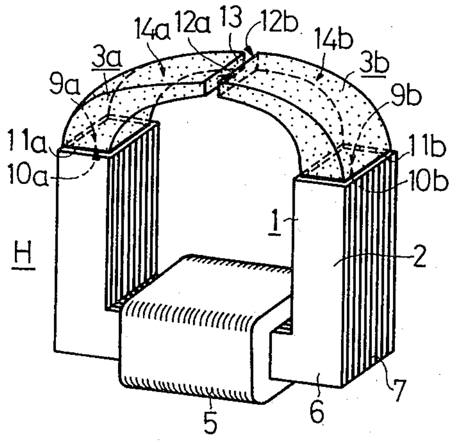

Turning now to FIG. 3, another example of this invention will hereinbelow be described. The magnetic head of the present example is identical in construction with that of FIG. 1 except that the end faces 9*a* and 9*b* of the core member 2 and those 11*a* and 11*b* of the core members 3*a* and 3*b* are selected in such a manner as to obtain a relation that the latter may be in included in the former in terms of shape and area, as is the case with the example of FIG. 2. Accordingly, no detailed description will be given but the same results as those obtainable with the example of FIG. 2 can be obtained.

Figure 4A:
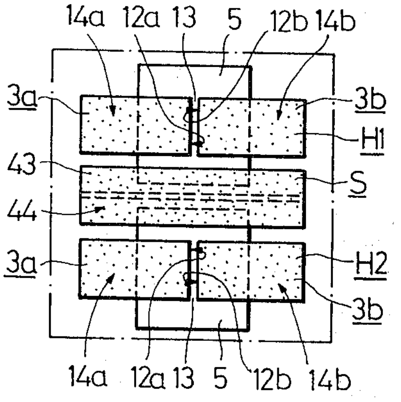
FIG. 4A is a front view illustrating one example of a multi-element magnetic head of this invention.
Figure 4B:
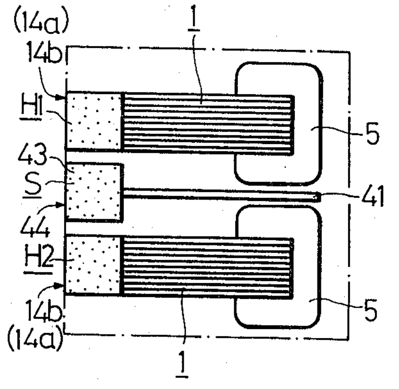
FIG. 4B is a side view of the magnetic head shown in FIG. 4A.

With reference to FIGS. 4A and 4B another example of this invention as being applied to a multi-element magnetic head will be described. In the figures there is illustrated a two-element magnetic head which employs two magnetic head elements (indicated by H1 and H2) described previously in connection with FIG. 1 and one magnetic shield plate identified by S.

In the magnetic head elements H1 and H2 parts corresponding to those in FIG. 1 are indicated by the same reference numerals and no detailed description will be repeated. As will be apparent from FIGS. 4A, 4B and 5, the magnetic shield plate S consists of a magnetic plate member 41 formed with magnetic alloy plates similar to those of the magnetic core member 2, of the magnetic head elements H1 and H2 being placed one on another or one magnetic alloy plate (in the figure, the magnetic shield plate S being shown to be formed with one plate) and a magnetic plate member 43 formed of ferrite similar to that for the magnetic core members 3*a* and 3*b* of the aforesaid magnetic head elements H1 and H2 and joined to the end face of the magnetic plate member 41 through the use of an adhesive binder 42. The front of the magnetic plate member 43 on the opposite side from the magnetic plate member 41 is used as a magnetic tape contact surface 44 corresponding to those 14*a* and 14*b* of the magnetic head elements H1 and H2. In this case, the magnetic plate member 41 is much thinner than that 43. The magnetic heads H1 and H2 are disposed with the magnetic shield plate S interposed therebetween.

Figure 5:
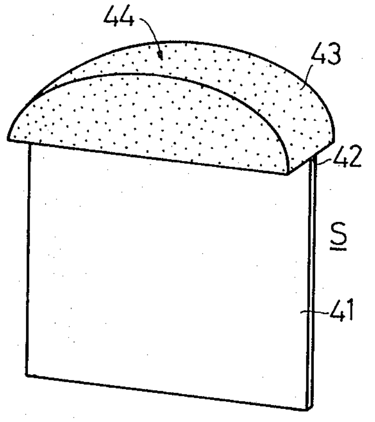
FIG. 5 is a perspective view of a shield plate applicable to the multi-element magnetic head of this invention.

With the multi-element magnetic head of this invention depicted in FIGS. 4A and 4B, the magnetic head elements H1 and H2 provides the excellent effects described previously in connection with FIG. 1 and the magnetic head contact surface 44 of the magnetic shield plate S has wear resistance equal to that of the tape contact surfaces 14*a* and 14*b* of the magnetic head elements H1 and H2. Accordingly, even after the magnetic head is used for a long time, the tape contact surfaces of the magnetic shield plate S and the magnetic head elements H1 and H2 are substantially flush with each other, so that there is no possibility that the magnetic tape becomes curved and expanded unnecessarily. Further, since the magnetic plate member 41 of the magnetic shield plate S is formed of a magnetic alloy material and its workability is excellent, it may be much thinner than the magnetic plate member 43 as depicted in FIG. 5. Therefore, if the positions of the coils 5 of the magnetic head elements H1 and H2 on the core member 2 are preselected to correspond to the position of the magnetic plate member 41 as shown in FIGS. 4A and 4B, the distance between the adjoining magnetic head elements H1 and H2 may be selected to be a much small value which is a little greater than the thickness of the magnetic plate member 43 of the shield plate S, so that high-density multi-element magnetic head can be obtained.

The multi-element magnetic head shown in FIGS. 4A and 4B has been described in connection with the case where the magnetic head H depicted in FIG. 1 is employed but the magnetic head H of FIGS. 2 or 3 may also be used, of course.

It will be apparent that many modifications and variations may be effected without departing from the scope of the novel concepts of this invention.

I claim as my invention:

1. A multi-element magnetic head comprising at least first and second magnetic head elements, and a magnetic shield plate interposed between the first and second magnetic head elements, in which each of the first and second magnetic head elements is made up of a magnetic core consisting of a U-shaped first magnetic core member formed with laminated magnetic alloy plates and second and third magnetic core members formed of ferrite and a coil wound on the first magnetic core member; one end of each of the second and third magnetic core members of the magnetic core is joined to each end face of the first magnetic core member; the second and the third magnetic core members extend inwardly to form a magnetic gap between the end faces thereof on the opposite side from the first magnetic core member; the exterior surfaces of the second and third magnetic core members on the side of the magnetic gap serve as a magnetic tape contact surface; the magnetic shield plate consisting of a first magnetic plate member formed of a magnetic alloy plate and a second magnetic plate member formed of ferrite and joined to the end face of the first magnetic plate member, the second magnetic plate member being thicker than the first magnetic plate member; and the end face of the second magnetic plate member on the opposite side from the first magnetic plate member serves as a magnetic tape contact surface corresponding to those of the first and second magnetic head elements.

* * * * *